(12) United States Patent
Issari (10) Patent No.: US 7,309,732 B1
(45) Date of Patent: Dec. 18, 2007

(54) UV AND UV/MOISTURE DUAL CURABLE COMPOSITIONS WITH IMPROVED CURE THROUGH VOLUME

(75) Inventor: Bahram Issari, Rocky Hill, CT (US)

(73) Assignee: Henkel Corporation, Rocky Hill, CT (US)

( * ) Notice: Subject to any disclaimer, the term of this patent is extended or adjusted under 35 U.S.C. 154(b) by 521 days.

(21) Appl. No.: 10/419,201

(22) Filed: Apr. 21, 2003

(51) Int. Cl.
*C08L 83/04* (2006.01)

(52) U.S. Cl. .......................... 524/588; 525/479; 528/17; 522/71

(58) Field of Classification Search ................ 524/588; 525/479; 528/17; 522/71
See application file for complete search history.

(56) References Cited

U.S. PATENT DOCUMENTS

| | | | |
|---|---|---|---|
| 1,323,869 A | 12/1919 | Kraft | |
| 4,072,635 A * | 2/1978 | Jeram | 523/218 |
| 4,111,890 A | 9/1978 | Getson et al. | 260/37 |
| 4,201,808 A | 5/1980 | Cully et al. | 428/40 |
| 4,252,526 A | 2/1981 | Madhavan et al. | 433/228 |
| 4,266,166 A * | 5/1981 | Proud et al. | 315/248 |
| 4,309,334 A | 1/1982 | Valitsky | 260/42.15 |
| 4,348,454 A | 9/1982 | Eckberg | 428/334 |
| 4,528,081 A | 7/1985 | Lien et al. | 204/159.13 |
| 4,675,346 A * | 6/1987 | Lin et al. | 522/39 |
| 4,699,802 A | 10/1987 | Nakos et al. | 427/54.1 |
| 4,753,704 A | 6/1988 | Stewart | 156/275.5 |
| 5,013,768 A | 5/1991 | Kiriyama et al. | 522/64 |
| 5,362,769 A | 11/1994 | Waller et al. | 523/116 |
| 5,378,734 A * | 1/1995 | Inoue | 522/11 |
| 6,011,105 A * | 1/2000 | Ota et al. | 524/494 |
| 6,281,261 B1 | 8/2001 | Bennington | 522/99 |
| 6,323,253 B1 | 11/2001 | Bennington | 522/16 |
| 6,660,374 B2 | 12/2003 | Smetana et al. | 428/327 |

FOREIGN PATENT DOCUMENTS

| | | |
|---|---|---|
| EP | 0 808 874 B1 | 9/1999 |
| EP | 0 808 875 B1 | 9/1999 |
| EP | 0 801 111 B1 | 12/1999 |
| GB | 2 039 287 | 8/1980 |
| JP | 07-026061 * | 1/1995 |

OTHER PUBLICATIONS

Chem. Abs., 128:168854s, (1998), citing Chinese Patent Document CN 1,144,237.

* cited by examiner

*Primary Examiner*—Kuo-Liang Peng
(74) *Attorney, Agent, or Firm*—Steven C. Bauman (57) ABSTRACT

The present invention is directed to silicone formulations which are capable of being rapidly cured to tough elastomeric materials through exposure to UV radiation, and optionally through exposure to moisture as well. The cured products demonstrate high resistance to flammability and combustibility.

19 Claims, 5 Drawing Sheets

UV AND UV/MOISTURE DUAL CURABLE COMPOSITIONS WITH IMPROVED CURE THROUGH VOLUME

BACKGROUND OF THE INVENTION

1. Field of the Invention

This application relates to UV and UV/moisture dual curable compositions with improved cure through volume, which may also demonstrate high resistance to flammability and combustibility.

2. Brief Description of Related Technology

Moisture-curing mechanisms, heat-curing mechanisms, and photo-initiated curing mechanisms are among the means used to initiate cure, i.e., cross-linking, of reactive compositions, such as reactive silicones. These mechanisms are based on either condensation reactions, whereby moisture hydrolyzes certain groups, or addition reactions that can be initiated by a form of energy, such as electromagnetic radiation or heat. In certain compositions, a combination of such cure mechanisms may be used to achieve the desired results.

For example, reactive polyorganosiloxanes can be cured by heat in the presence of a peroxide. Alternatively, these reactive siloxanes can also be cured by heat in the presence of silicone hydride-containing (—SiH) compounds and a metallic hydrosilylation catalyst, such as an organo-platinum catalyst.

UV curing silicones having methacrylate functional groups are known. For instance, U.S. Pat. No. 4,675,346 (Lin), the disclosure of which is hereby expressly incorporated herein by reference, is directed to UV curable silicone compositions including at least 50% of a specific type of silicone resin, at least 10% of a fumed silica filler and a photoinitiator, and cured compositions thereof.

Other known UV curing silicone compositions include those disclosed in Great Britain U.S. Pat. No. 1,323,869 [composition for plate-making in printing consisting of an organopolysiloxane containing a (meth)acrylate functional group, a photosensitizer, and a solvent, which cures to a hard film]; U.S. Pat. Nos. 4,201,808 (Culley) and 4,348,454 (Eckberg) (compositions of an organopolysiloxane having an average of at least one acryloxy and/or methacryloxy group per molecule; a low molecular weight polyacrylyl crosslinking agent; and a photosensitizer, reported as being suitable for release coatings and curable upon exposure to UV radiation); and Great Britain U.S. Pat. No. 2,039,287 (composition for protective coatings on paper prepared from the reaction of methacryloxypropyltrimethoxysilane and low molecular weight hydroxyl-terminated polyorganosiloxanes).

UV/moisture dual curing silicone compositions are also known. See U.S. Pat. Nos. 4,528,081 (Nakos) and 4,699,802 (Nakos), the disclosures of each of which are hereby incorporated herein by reference.

In certain commercial applications of such silicone formulations, flammability and combustibility is a concern, particularly where it is an issue in production or with the end user. As a result, ordinarily only a subset of such silicone formulations have been used in such instances.

In the past, to alleviate the concern, heat-curable silicone compositions have been used where moldability of the composition itself and electrical properties of the cured product were desirable. Such heat-curable silicone compositions have been rendered resistant to flammability and combustion through the addition of halogenated materials, fillers, organo-platinum materials, and benzotriazoles.

However, the use of halogenated materials to achieve that property is undesirable because of toxicity and environmental concerns, as well as possibly contaminating the substrate on which the composition is placed.

Other ways of rendering such heat-curable silicone compositions resistant to ignition are also known. For instance, European Patent Application Nos. 801 111, 808 874 and 808 875, each relate to liquid silicone rubber compositions which, after cure, are reported as producing a highly flame retardant silicone rubber. The compositions are polyorganosiloxane-based, and contain silica filler, aluminum hydroxide, benzotriazole, and a platinum-3,5-dimethyl-1-hexyn-3-ol reaction mixture. The compositions may further include zinc carbonate, polyorganohydrogensiloxane, and a hydrosilylation reaction catalyst.

In addition, a Chemical Abstracts citation to a Chinese patent document refers to a flame retardant silicone rubber for dielectric coatings of electric wire containing a vinyl-siloxane rubber, benzotriazole, chloroplatinic acid, a silica filler, and hydroxy silicone oil. See Chem. Abs. 128:168854s (1998)(citing Chinese Patent Document CN 1,144,237). Vinyl-siloxane rubbers are ordinarily curable by thermal mechanisms.

However, with certain commercial applications, heat-curable silicones present shortcomings. Those shortcomings include their limited usefulness with heat-sensitive substrates and/or heat-sensitive electronic circuitry. In addition, heat-curable silicones generally are slower to cure than silicones curable through other mechanisms, such as light cure. Such a shortcoming is seen to be troublesome in the fabrication of devices, where the slower cure speed renders the fabrication process otherwise less efficient. Therefore, the applicability of such heat-curable silicones across a wide range of end-use applications appears to be limited.

Indeed, in those applications where a UV curable silicone composition would be desirable, one could not simply use the flame retardant materials as they have been used in the past with heat-curable silicones to impart such properties. That is, certain of these filler materials generally (and in the amounts called for by the EP '111, '874 and '875 publications) would render the compositions less transmissive to light (and oftentimes opaque). Compositions containing such fillers, thus, may not be cured properly by exposure to UV radiation. That is, at best a surface skin may form, but cure through volume likely will not occur due to interference by the filler.

And, a Chemical Abstracts citation to a Japanese patent document refers to UV-curable polysiloxane coating compositions reportedly having flame retardant capabilities. These silicone compositions contain a siloxane component, 2-hydroxy-2-methyl-1-phenylpropane and aluminum acetylacetonate. These compositions do not however appear to be filled, and they therefore may not possess the strength required of a cured material in a sealant or conformal coating application.

Recently, Loctite Corporation has designed and developed UV and UV/moisture dual curable silicone compositions, which also demonstrate high resistance to flammability and combustibility, where the flame-retardant component is claimed to be the combination of hydrated alumina and a member selected from the group consisting of organo ligand complexes of transition metals, organosiloxane ligand complexes of transition metals, and combinations thereof. See U.S. Pat. Nos. 6,281,261 (Bennington) and 6,323,253 (Bennington)

A drawback to conventional radiation curable compositions is the degree of radiation penetration beneath the surface of the dispensed composition. Heretofore, the use of light transmissive fillers has been reported with certain curable compositions. See e.g. U.S. Pat. Nos. 5,362,769 (Wailer) (for instance at col. 4, lines 28-40), 4,309,334 (Valitsky) (for instance at col. 6, lines 53-63), 4,753,704 (Stewart) (for instance at col. 3, lines 6-14) and 4,252,526 (Madhavan).

Notwithstanding the state of the technology it would be desirable to provide a UV, and optionally moisture, curable composition, which possesses improved cure through volume properties and which demonstrates commercially acceptable tack free time upon curing. In addition, it would be desirable for such compositions to demonstrate flame- and combustion-retardant properties when cured.

SUMMARY OF THE INVENTION

The present invention is directed to curable compositions, which are capable of being rapidly cured to tough elastomeric materials through exposure to UV light and, optionally, exposure to moisture. The compositions demonstrate improved cure through volume, and in certain aspects, cured products demonstrate high resistance to flammability and combustibility Particularly desirable curable compositions are based at least in part on reactive silicones, and the light used in the curing thereof is comprised of UV light.

More specifically, the compositions of the present invention include:

(a) a curable component, such as a silicone resin component including a reactive polyorganosiloxane having at least one functional group selected from (meth)acrylate, carboxylate, maleate, cinnamate and combinations thereof, and optionally, an alkoxy or aryloxy functional group;

(b) a photoinitiator component; and (c) a filler component, where the filler component is substantially transmissive to UV radiation. Optionally, the inventive composition may include a flame-retardant component in an amount effective to enhance the resistance of the composition to flammability. In addition, the inventive composition may include an inorganic filler component.

The flame-retardant component may be selected from organometallic or silyl metallic materials, aluminas, such as hydrated aluminas, precipitated silicas, and combinations thereof.

The present invention also provides methods of preparing the inventive compositions, methods of using such compositions, and reaction products of such composition.

An improvement to the recognized drawback of limited radiation penetration is demonstrated through the present invention, which incorporates fillers that are substantially transmissive to UV radiation, which is ordinarily used to cure the compositions. These substantially UV radiation transmissive fillers may be used in conjunction with conventional inorganic fillers, if desired. In effect, the use of the substantially UV radiation transmissive fillers in the inventive compositions reduces the distance radiation travels within the composition to penetrate to a certain depth. Further, due to the increase in UV radiation penetration, reflected UV radiation within the composition may enhance cure in areas not exposed directly to the UV radiation.

The present invention will be more readily appreciated by a reading of the section entitled "Detailed Description of the Invention" which follows below.

DETAILED DESCRIPTION OF THE INVENTION

Figure 1:
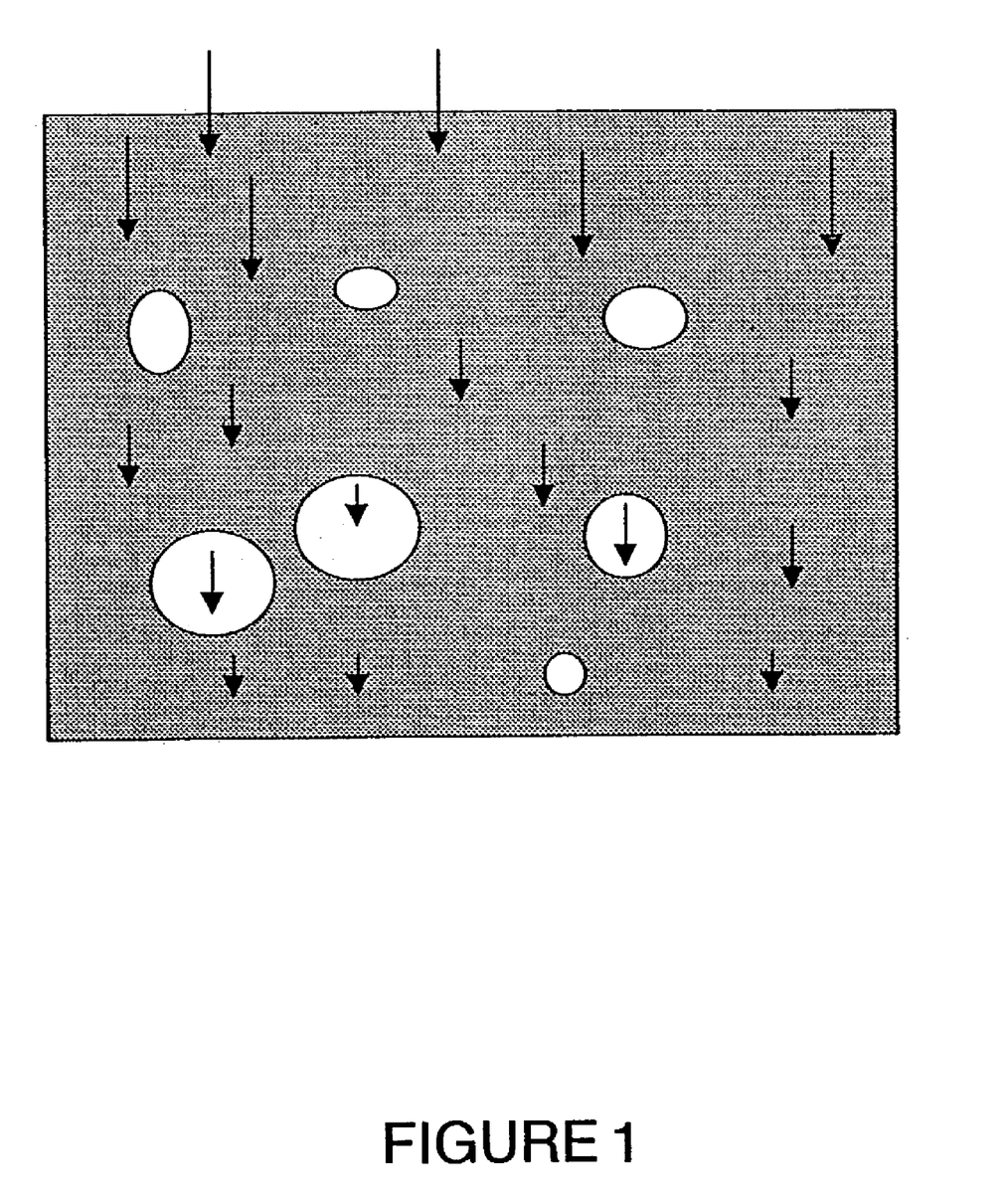
FIG. 1 depicts a formulation within the scope of the invention with arrows indicating light passing at least in part therethrough by virtue of the substantially UV radiation transmissive filler.
Figure 2:
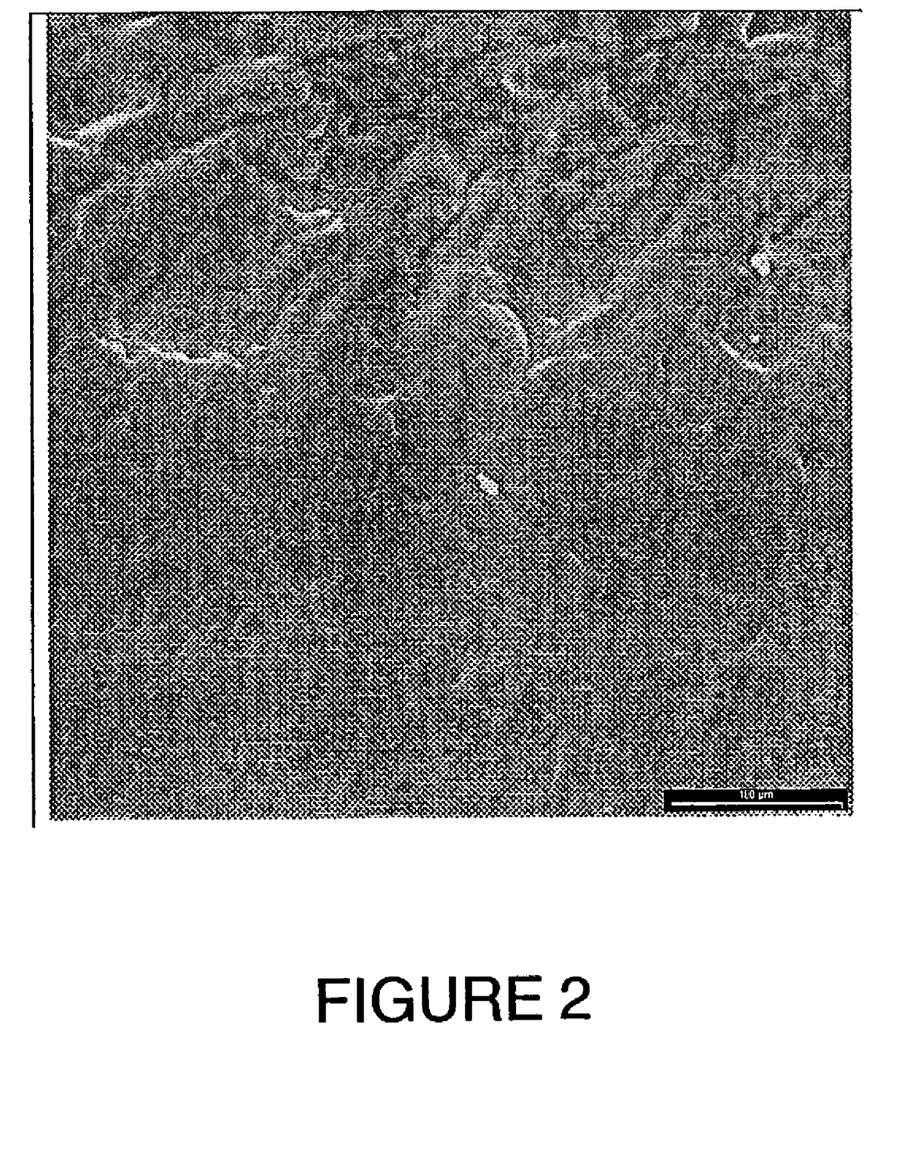
FIG. 2 depicts a photomicrograph of a cross sectional view of a cured composition, without the substantially UV radiation transmissive filler.
Figure 3:
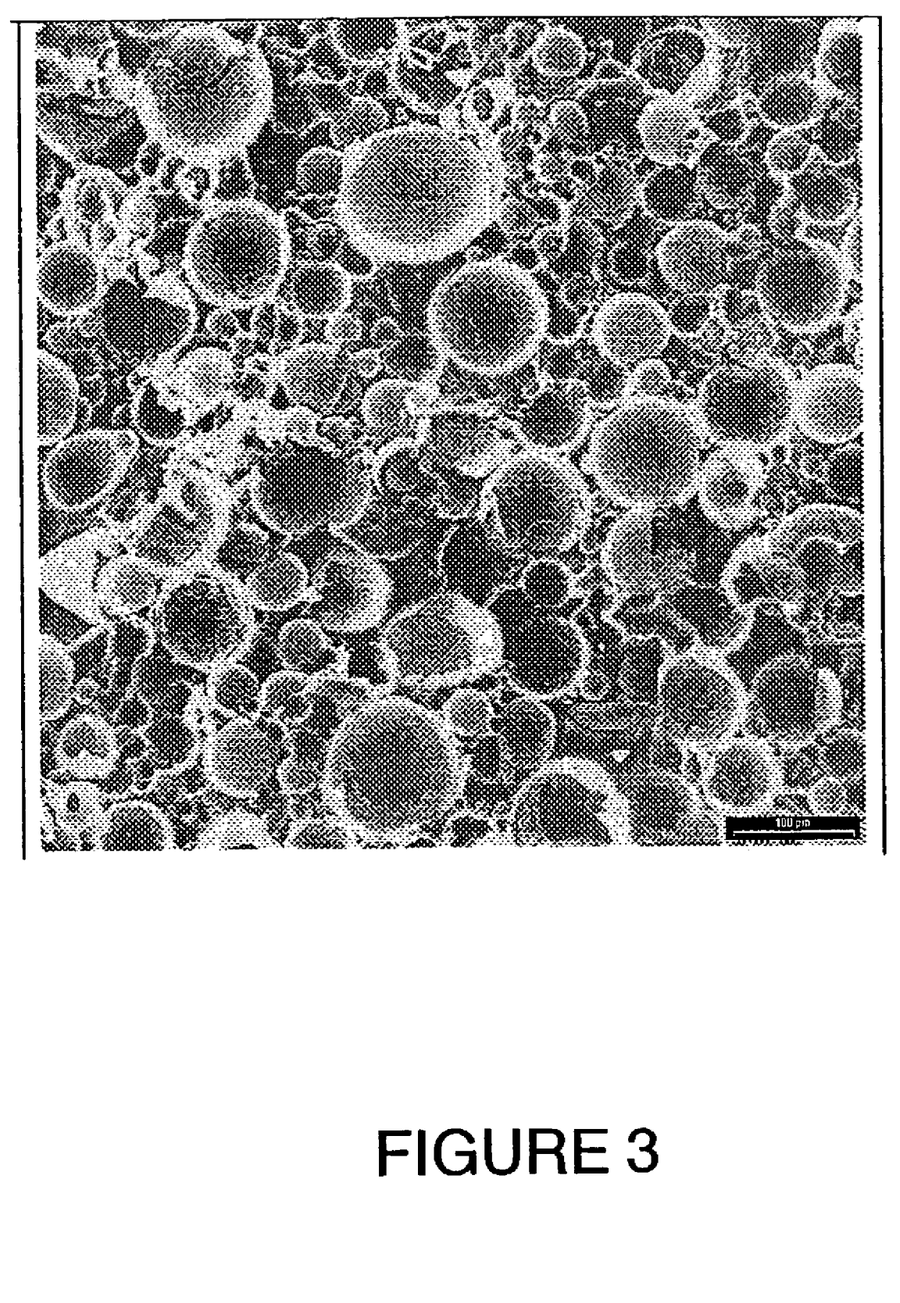
FIG. 3 depicts a photomicrograph of a cross sectional view of a cured composition, with the substantially UV radiation transmissive filler.
Figure 4:
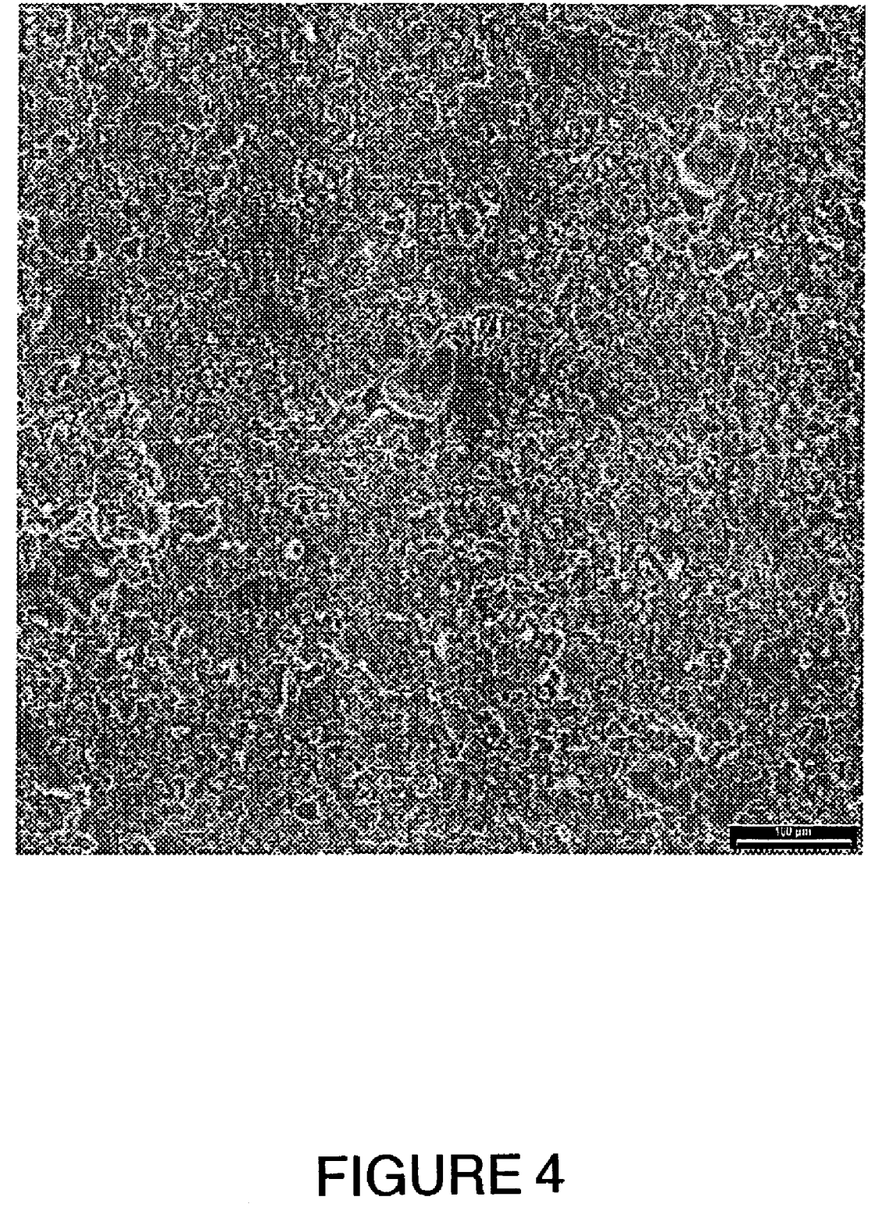
FIG. 4 depicts a photomicrograph of a surface view of a cured composition, without the substantially UV radiation transmissive filler.
Figure 5:
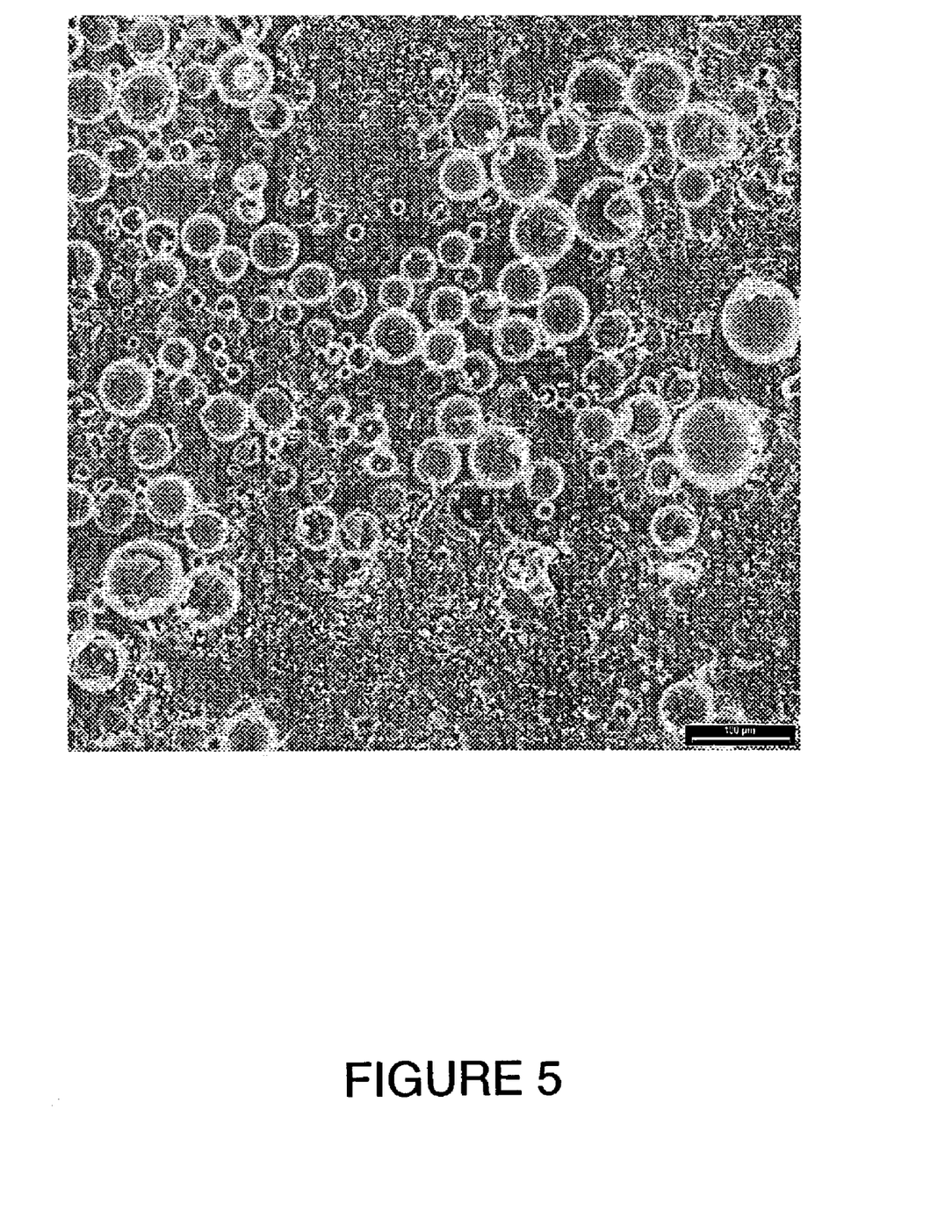
FIG. 5 depicts a photomicrograph of a surface view of a cured composition, with the substantially UV radiation transmissive filler.

Generally, the curable component has a backbone that may be based on silicone, urethene, polyalkylene, polyalkylene oxide, and combinations thereof, and pendant and/or terminating therefrom are UV reactive groups and optionally moisture reactive groups.

In a desirable aspect of the invention, the compositions are silicone-based, functionalized with at least one group selected from (meth)acrylate, carboxylate, maleate, cinnamate and combinations thereof. These groups render the silicone material(s) susceptible to UV curing. In addition, in those instances where moisture cure is also desirable, the polymerizable component also includes at least one alkoxy or aryloxy functional group. While the invention is not limited to such types of materials, for the sake of convenience the invention will be described for the most part in these terms.

As used herein, the term "(meth)acrylate" is intended to refer to groups of the structure where $R^1$ is H or alkyl. Acrylate, methacrylate and ethacrylate groups are examples of such (meth)acrylate groups.

As used herein, the terms "alkoxy group" and "aryloxy group" are intended to refer to groups of the structure, $R^2$—O, where $R^2$ is alkyl or aryl, examples of which include methoxy, ethoxy and phenoxy.

Representative silicones include those within structure I:

where $R^1$, $R^2$, and $R^3$ and may be the same or different and are organo groups including alkyls, such as methyl, ethyl and the like, halo alkyls such as 3,3,3-trifluoropropyl, substituted or unsubstituted aryls, such as benzyl or phenyl, alkoxy or substituted or unsubstituted aryloxy, such as methoxy, ethoxy and phenoxy, and others such as vinyl, alkyloxyalkyl, such as acryloxy propyl, methacryloxyalkyl, such as methacryloxypropyl, mercaptopropyl, hydrogen or benzoin groups; $R^4$ is alkyl, such as methyl, ethyl and the like; $R^5$ is alkylene, such as $C_{1-8}$ alkylene with or without substitution or interruption by one or more heteroatoms; and n may be from 1 to several thousand, though desirably n is at least 80.

Desirably, $R^1$ and $R^2$ are alkyl groups, such as methyl; $R^3$ is methoxy; $R^4$ is methyl; and $R^5$ is propylene. In the case of a UV/moisture dual curable silicone, at least one $R^3$ is desirably methoxy.

As noted, the number of repeat units in the silicone of structure I should be as few as one or may be as great as several thousand. Generally, a repeat unit of at least about 80 is desirable in order to obtain the desired gel or elastomeric properties in the cured material.

The substantially UV radiation transmissive fillers may be obtained from many commercial sources, such as Kish Co. Inc., Mentor, Ohio. The hollow microspheres supplied by Kish under the tradename Q-CEL are free flowing powders, white in color. Generally, these borosilicate hollow microspheres are promoted as extenders in reactive resin systems, ordinarily to replace heavy fillers, such as calcium carbonate, thereby lowering the weight of composite materials formed therewith. Q-CEL 5019 hollow microspheres are constructed of a borosilicate, with a liquid displacement density of 0.19 $g/cm^2$, a mean particle size of 70 microns, and a particle size range of 10-150 um. Other Q-CEL products are shown below in tabular form.

| Type | Liquid Displacement Density ($g/cm^3$) | Mean Particle Size (um) | Particle Size Range (um) | Working Pressure |
|---|---|---|---|---|
| 300 | 0.21 | 90 | 5-250 | |
| 5028 | 0.27 | 65 | 5-150 | |
| 6042S | 0.42 | 50 | 5-90 | |
| 6014 | 0.13 | 85 | 5-200 | 250 |
| 6019 | 0.20 | 75 | 5-175 | 500 |
| 6019S | 0.19 | 55 | 5-150 | 500 |
| 6036 | 0.36 | 60 | 5-150 | 1000 |
| 6042 | 0.42 | 55 | 5-125 | 2000 |
| 6048 | 0.48 | 50 | 5-100 | 3000 |
| 6717 | 0.19 | 52/55 | 5-100 | 500 |
| 6545 | 0.02 | 100 | 5-105 | 500 |
| 7019 | 0.19 | 78/80 | 5-150 | 500 |
| 7040S | 0.4 | 48 | 5-90 | |
| 5043 | 0.43 | 75 | 5-75 | 2000 |
| PM 7228 | 0.26 | 65 | 5-90 | |
| 7023 | 0.23 | 75 | 10-150 | |
| PM 7220 | 0.20 | 50 | 10-125 | |
| 5032S | 0.32 | 50 | 5-90 | |
| 645D | 0.45 | 100 | 5-105 | 3000 |
| 6550 | 0.022 | 35 | 10-200 | |
| KM 1005 | 0.85 | 35 | 8-63 | |
| KM 1000PLS | 0.85 | | 5-63 | |

The substantially UV radiation transmissive filler should have a diameter varied according to desired properties in the uncured and cured state, and the curing profile.

Another commercially available hollow glass microsphere is sold by Kish under the tradename SPHERICEL. SPHEREICEL 110P8 has a mean particle size of about 11.7 microns, and a crush strength of greater than 10,000 psi.

Yet other commercially available hollow glass microsphere are sold by the Schundler Company, Metuchen, N.J. under the PERLITE tradename, Whitehouse Scientific Ltd., Chester, UK and 3M, Minneapolis, Minn. under the SCOTCHLITE tradename.

Solid microspheres may be used as the substantially UV radiation transmissive filler, as well. For instance, Kish supplies commercially solid glass filler beads under the tradename K-LITE. K-LITE 5, K-LITE 7F and K-LITE 7 are commercially available examples of such solid glass filler beads. The median diameters of these products are respectively 43 um, 39 um and 28 um.

An optional component in the inventive compositions is an inorganic filler component. When present, this component adds structural properties to the cured composition, as well as confers flowability properties to the composition in the uncured state. This component may often be reinforcing silicas, such as fumed silicas, and may be untreated (hydrophilic) or treated so as to render them hydrophobic. Virtually any reinforcing fumed silica may be used.

When present, the fumed silica should be used at a level of up to about 50 weight percent, with a range of about 4 to at least about 10 weight percent, being desirable. While the precise level of silica may vary depending on the characteristics of the particular silica and the desired properties of the composition and the reaction product thereof, care should be exercised by those persons of ordinary skill in the art to allow for an appropriate level of transmissivity of the inventive compositions to permit a UV cure to occur.

Desirable hydrophobic silicas include hexamethyldisilazane-treated silicas, such as those commercially available from Wacker-Chemie, Adrian, Mich. under the trade designation HDK-2000. Others include polydimethylsiloxane-treated silicas, such as those commercially available from Cabot Corporation under the trade designation CAB-O-SIL N70-TS, or Degussa Corporation under the trade designation AEROSIL R202. Still other silicas include trialkoxyalkyl silane-treated silicas, such as the trimethoxyoctyl silane-treated silica commercially available from Degussa under the trade designation AEROSIL R805; and 3-dimethyl dichlorosilane-treated silicas commercially available from Degussa under the trade designation R972, R974 and R976.

The photoinitiator component may be any photoinitiator known in the art to cure acrylic functionalities, including benzoin and substituted benzoins (such as alkyl ester substituted benzoins), Michler's ketone, dialkoxyacetophenones, such as diethoxyacetophenone ("DEAP"), benzophenone and substituted benzophenones, acetophenone and substituted acetophenones, and xanthone and substituted xanthones. Desirable photoinitiators include DEAP, benzoin methyl ether, benzoin ethyl ether, benzoin isopropyl ether, diethoxyxanthone, chloro-thio-xanthone, azo-bisisobutyronitrile, N-methyl diethanolaminebenzophenone, and mixtures thereof. Visible light initiators include camphoquinone, peroxyester initiators and non-fluorene-carboxylic acid peroxyesters.

Commercially available examples of photoinitiators include those from Vantico, Inc., Brewster, N.Y. under the IRGACURE and DAROCUR tradenames, specifically IRGACURE 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl)phenyl phosphine oxide] and DAROCUR 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and IRGACURE 784DC (bis(η⁵-2,4-cyclopentadien-1-yl)-bis[2,6-difluoro-3-(1H-pyrrol-1-yl)phenyl]titanium).

Particularly desirable photoinitiators include DEAP. Generally, the amount of photoinitiator should be in the range of about 0.1% to about 10% by weight, such as about 2 to about 6% by weight.

In those compositions in which moisture cure capabilities are also present, a moisture cure catalyst should also be included in an amount effective to cure the composition. For example, from about 0.1 to about 5% by weight, such as about 0.25 to about 2.5% by weight, of the moisture cure catalyst is desirable. Examples of such catalysts include organic compounds of titanium, tin, zirconium and of course combinations thereof. Tetraisopropoxytitanate and tetrabutoxytitanate are particularly desirable. See also U.S. Pat. No. 4,111,890, the disclosure of which is expressly incorporated herein by reference.

When used, the flame-retardant component should be present in the composition in an amount effective to enhance the resistance of the composition to flammability and combustion. Typically, the flame-retardant component should be present in an amount up to about 70% by weight, with 20-60% by weight being particularly desirable to achieve the desired affect.

Suitable components include hydrated aluminas, precipitated silicas (such as those available commercially under the AEROSIL tradename from Degussa Corporation), hydrated zinc borates (such as those available commercially under the FIREBREAK ZB tradename from Harwick Standard Distribution Corp.), and combinations thereof.

A further component which may be included in the inventive compositions is a reactive diluent, such as (meth) acrylates, for instance those represented by $H_2C=CGCO_2R^6$, where G may be hydrogen, halogen or alkyl of 1 to about 4 carbon atoms, and $R^6$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulonate, sulfone and the like.

More specific (meth)acrylates particularly desirable for use as a reactive diluent include polyethylene glycol di(meth)acrylates, bisphenol-A di(meth)acrylates, such as ethoxylated bisphenol-A (meth)acrylate ("EBIPA" or "EBIPMA"), and tetrahydrofuran (meth)acrylates and di(meth) acrylates, citronellyl acrylate and citronellyl methacrylate, hydroxypropyl(meth)acrylate, hexanediol di(meth)acrylate ("HDDA" or "HDDMA"), trimethylol propane tri(meth) acrylate, tetrahydrodicyclopentadienyl(meth)acrylate, ethoxylated trimethylol propane triacrylate ("ETTA"), triethylene glycol diacrylate and triethylene glycol dimethacrylate ("TRIEGMA"), isobornyl acrylate and isobornyl methacrylate, and an acrylate ester corresponding to structure III as shown below:

III where $R^7$ may be selected from hydrogen, alkyl of 1 to about 4 carbon atoms, hydroxyalkyl of 1 to about 4 carbon atoms or $R^8$ may be selected from hydrogen, halogen, and alkyl of 1 to about 4 carbon atoms;

$R^9$ may be selected from hydrogen, hydroxy and m is an integer equal to at least 1, e.g., from 1 to about 8 or higher, for instance, from 1 to about 4;

n is an integer equal to at least 1, e.g., 1 to about 20 or more; and v is 0 or 1.

Specific examples of desirable reactive diluents include phenoxyethyl(meth)acrylate and isobornyl (meth)acrylate.

Of course, combinations of these (meth)acrylates may also be used as a reactive diluent.

When present, the reactive diluent may be used in an amount within the range of about 0.01 to about 30, such as about 0.05 to about 10 weight percent.

The compositions of the invention may also include other ingredients to modify the cured or uncured properties as desired for specific applications. For instance, adhesion promoters, such as (meth)acryloxypropyltrimethoxysilane, trialkyl- or triallyl-isocyanurate, glycidoxypropyl trimethoxysilane, vinyl trimethoxysilane and the like, may be incorporated at levels up to about 5 weight percent.

Other optional ingredients include non-(meth)acrylated silicone diluents or plasticizers at levels of up to about 30 weight percent. The non-(meth)acrylated silicones include trimethylsilyl-terminated oils of 100-500 csp viscosity and silicone gums. The non-(meth)acrylated silicones may include co-curable groups, such as vinyl groups.

The trimethylsilyl-terminated oils include trimethylsilyl-terminated polydimethylsiloxanes having a viscosity within the range of between about 100 and 5,000 cps.

The physical characteristics of cured reaction products obtained from a given composition will depend in part on the type, identity, amount and molecular weight of the curable component.

This invention also provides a process for preparing a composition, the steps of which include providing and mixing together the components noted above.

Once prepared, the inventive compositions may be used through application to a desired substrate. For instance, the inventive compositions may be applied to a desired substrate by a brush, dip or spray method, or by a pressure-time dispense method, as are well known in the silicone art. The substrates onto which the compositions may be applied include a variety of materials, such as glass, metal or plastic, particularly when the compositions are to be used in electronic applications.

After the application is complete, exposure to UV radiation region should provide the means for curing to occur. UV radiation sources useful to cure the compositions into cured reaction products include conventional mercury-vapor lamps designed to emit ultraviolet energy in various ultraviolet wavelength bands. For example, useful UV radiation wavelength ranges include 220 to 400 nm.

In electronic applications, it is not uncommon for elevated temperatures to be reached, particularly in localized regions within the device on which the composition has been applied and cured. Such an environment is commonly present during the operation of a crt monitor, such as a television.

Accordingly, in one aspect of the present invention, particular attention is paid to reducing the flammability or combustibility of the cured reaction product, particularly in the environment in which it is intended to be used.

A standard test for measuring flammability and/or combustibility is known as Underwriters Laboratories UL94, "Test for Flammability of Plastic Materials—UL-94" (Jul. 29, 1997), the disclosure of which is hereby expressly incorporated herein by reference. In this test, the materials are classified as V-0, V-1, or V-2 depending on the flame-retardant performance.

Particularly desirable materials in accordance with this invention should reach a V-0 classification, although certain formulations may be classified at a lower level (such as V-1), depending on the end use for which the material is intended. Details of this test and the performance of cured reaction products within the scope of the invention under test conditions are provided below in the examples.

It can be seen that many compositions within the scope of the present invention may be formulated to produce a range of cured properties such as may be useful as coating, sealing and potting electronic components in assemblies or devices, which when used in their intended manner are often exposed conditions of elevated temperatures. Under such conditions, products and reaction products of known silicone compositions may ignite or combust, thereby damaging the electronic component, or the assembly or device in which it is used, as well as the surrounding environment and possibly the end user. The present invention addresses such a circumstance.

The following examples are illustrative of the invention.

EXAMPLE 1

Increased Penetration Distance of Radiation into Liquid or Solid Matrices by Incorporation of Substantially UV Radiation Transmissive Fillers Sample Nos. 1 and 2, and 1a and 2a were prepared from the noted components in the listed amounts, or as described below.

TABLE 1

| Components | | Sample No./Amt. (Gms) | | |
|---|---|---|---|---|
| Type | Identity | 1 | 2 | 3 |
| Curable Resin | (Meth)acrylate-terminated PDMS (12,000 MW) | 23.87 | 30.74 | 22.62 |
| Flame Retardant | Aluminum Trihydrate | 61.49 | 58 | 62.34 |
| Adhesion Promoter | Glycidoxypropyl Trimethoxysilane | 0.036 | 0.4 | 0.037 |
| Odor mask | TC-709 | 0.019 | 0.04 | 0.019 |
| Photo-initiator | IRGACURE 1700 | 0.46 | 0.4 | 0.47 |
| Reactive Diluent | Isobornyl Acrylate/ 2-Phenoxyethyl Acrylate Combination | 12.22 | 10.4 | 12.59 |

Sample No. 1 was cured by exposure to UV radiation at an intensity of 70 mW/cm² for a period of time of 60 seconds. The depth of cure was measured to be 2.6 mm, by exposing the samples to UV radiation to cure within the groove of a steel platform, with the groove exhibiting a slope creating a range of depth of from zero to 10 mm. The curved strip was removed from the platform and the maximum cure depth was recorded. Sample No. 2 was cured as above, and determined to have a depth of cure of 3.3 mm. Q-CEL 5019 (1.9 g) was added to Sample No. 1 to form Sample No. 1a (to make a total of 100 g). Sample No. 1a was cured as above, and determined to have a depth of cure of 4.03 mm. Q-CEL 5019 (1 g) was added to Sample No. 2 to form Sample No. 2a, and determined to have a depth of cure of 4.7 mm.

Sample No. 3 also contained 1.94 weight percent of Q-CEL 5019. Sample No. 3 was cured by exposure to UV light and determined to have a UV depth of cure of 3.35 mm upon UV exposure for 60 seconds, and its surface tackiness was observed to be good. Cured Sample No. 3 was subjected to a durometer test to measure its hardness and determined to have a Shore A hardness of 84.

Thus, the depth of cure was shown to increase by the addition of substantially UV radiation transmissive fillers.

Sample Nos. 4 and 5 were prepared with the components noted in Table 2 in the listed amounts, as above.

TABLE 2

| Components | | Sample No./Amt. (Gms) | |
|---|---|---|---|
| Type | Identity | 4 | 5 |
| Curable Resin | (Meth)acrylate-terminated PDMS (12,000 MW) | 30.74 | 30.74 |
| Photoinitiator | IRGACURE 1700 | 0.4 | 0.4 |
| Substantially UV Radiation Transmissive Filler | Q-CEL 5019 | — | 5.0 |
| Reactive Diluent | Isobornyl Acrylate/ 2-Phenoxyethyl Acrylate Combination | 10.4 | 10.4 |

The depth of cure for Sample No. 4 was determined to be 5.5 mm, and the depth of cure for Sample No. 5 was determined to be 5.2 mm.

Based on these results, the addition of Q-CEL 5019 reduced the depth of cure by 0.3 mm (compare Sample No. 4 with Sample No. 5). Also, the addition of aluminum trihydrate together with Q-CEL 5019 reduced the depth of cure by a further 0.5 mm to a total reduction of 0.8 mm (compare Sample No. 2 with Sample No. 5). In Sample No. 4, the addition of aluminum trihydrate without Q-CEL 5019 reduced the depth of cure by 2.2 mm.

Thus, the addition of Q-CEL 5019 together with aluminum trihydrate reduces the depth of cure by a lower amount than the addition of aluminum trihydrate itself.

Once cured, Sample No. 3 was determined to have a stress at maximum loading of 451.6 psi, and a percent strain at maximum loading of 28.1%. When used to form a lap shear assembly with a zero gap interface, Sample No. 3 once cured by UV exposure on each side, demonstrated adhesive failure at 111 psi. A comparable glass to aluminum lap shear assembly formed from Sample No. 3 with a sixty second UV exposure through the glass substrate demonstrated adhesive failure at 123.5 psi from the glass. And a comparable glass to polyimide (Kapton) lap shear assembly was formed with Sample No. 3 with a sixty second UV exposure through the glass substrate demonstrated adhesive failure at 88 psi from the glass.

EXAMPLE 2

According to a test method consistent with the UL-94 test method, Sample Nos. 1, 2, 3, 4, and 5 were dispensed into molds and cured as in Example 3 into test pieces of the following dimensions: 125±5 mm×13±5 mm×2 mm.

Five test pieces are arranged such that the middle of a flame may contact the middle portion of the test piece. The flame is maintained in such position relative to the test piece for a period of 10±0.5 seconds. The amount of time the test piece continues to flame after removal of the flame is termed the afterflame time.

Once the test piece stops afterflaming, the flame is positioned toward the same portion of the test piece for an additional period of time of 10±0.5 seconds. After this time period, the flame is removed and this second afterflame time is measured. The afterglow time is also measured thereafter.

After each flame application, five results are measured for the test pieces: (1) the first afterflame time ("$T^1$") or the second afterflame time ("$T^2$"); (2) total afterflame time; (3) the afterglow time after the second afterflamming; (4) whether the test pieces burn to the clamps; and (5) whether the test pieces drip flaming particles.

From these results, criteria conditions may be measured to determine whether the sample meets a V-0 designation. The criteria conditions are set forth below in Table 3:

TABLE 3

| Criteria Conditions | V-0 | V-1 | V-2 |
| --- | --- | --- | --- |
| Afterflame time (first or second) | ≦10 secs | ≦30 secs | ≦30 secs |
| Total afterflame time for any condition set | ≦50 secs | ≦250 secs | ≦250 secs |
| Afterflame plus afterglow time for each individual specimen after the second flame application | ≦30 secs | ≦60 secs | ≦60 secs |
| Afterflame or afterglow of any specimen up to the holding clamp | No | No | No |
| Cotton indicator ignited by flaming particles or drops | No | No | No |

Sample No. 3 performed well in accordance with these criteria conditions, and established a V-0 rating. With five replicators, the T1 values were each observed to be zero, and collectively zero; the T2 values were each observed to be two or less and collectively seven. This value is clearly within the criteria set for a UL-94 V-0 rating.

Among other commercial applications, the compositions of this invention may be used in the assembly and manufacture of consumer electronic devices to overcoat electrical connections.

What is claimed is:

1. A UV radiation curable flame-resistant composition consisting essentially of:
   a UV radiation curable silicone component;
   a filler component, wherein the filler component is substantially transmissive to UV;
   a photoinitiator component;
   a flame-retardant component in an amount effective to enhance the resistance of said composition to flammability;
   an inorganic filler component; and
   a reactive diluent.

2. A UV radiation curable flame-resistant composition consisting essentially of:
   a UV radiation curable silicone component;
   a filler component, wherein the filler component is substantially transmissive to UV;
   a photoinitiator component; and
   a reactive diluent component; and
   optionally an inorganic filler component wherein the inorganic filler component is a fumed hydrophobic silica filler, and
   optionally as a flame-retardant component hydrated alumina; and
   optionally a moisture cure catalyst, and
   optionally an adhesion promoter.

3. The composition according to claim 2, wherein the fumed silica filler is present and is a member selected from the group consisting of dimethyldichlorosilane-treated silica, hexamethyldisilazane-treated silica, and combinations thereof.

4. The composition according to claim 2, wherein the photoinitiator component is a member selected from the group consisting of benzoin and substituted benzoins, Michler's ketone, benzophenone and substituted benzophenones, acetophenone and substituted acetophenones, xanthone and substituted xanthones, and combinations thereof.

5. The composition according to claim 2, wherein the photoinitiator component is a member selected from the group consisting of 1-hydroxycyclohexyl phenyl ketone, 2-methyl-1-[4-(methylthio)phenyl]-2-morpholino propan-1-one, 2-benzyl-2-N,N-dimethylamino-1-(4-morpholinophenyl)-1-butanone, benzophenone, 2,2-dimethoxy-2-phenyl acetophenone, bis(2,6-dimethoxybenzoyl-2,4,4-trimethyl pentyl)phosphine oxide, and 2-hydroxy-2-methyl-1-phenyl-propan-1-one, bis(2,4,6-trimethyl benzoyl)phenyl phosphine oxide, 2-hydroxy-2-methyl-1-phenyl-1-propane, 2,4,6-trlmethylbenzoyldiphenyl-phosphine oxide, visible light [blue] photoinitiators, d1-camphorquinone, bis($\eta^5$-2,4-cyclopentadien-1-yl)-bis[2,6-difluoro-3-(1H-pyrrol-1-yl)phenyl]titanium, and combinations thereof.

6. The composition according to claim 2, wherein the moisture cure catalyst is selected from the group consisting of compounds of titanium, tin, zirconium and combinations thereof.

7. The composition according to claim 2, wherein the substantially UV radiation transmissive filler has a particle size range of 5-250 um.

8. The composition according to claim 2, wherein the adhesion promoter is a member selected from the group consisting of (meth)acryloxypropyltrimethoxysilane, trialkyl- or triallyl-isocyanurate, glycidoxypropyl trimethoxysilane, vinyl trimethoxysilane and combinations thereof.

9. Reaction products of the composition according to claim 2.

10. A process for preparing a composition in accordance with claim 2, the steps of which comprise:
    providing the components recited in claim 2 and mixing together the components to form the composition.

11. A UV radiation curable flame-resistant composition consisting essentially of:
    a UV radiation curable silicone component;
    a filler component, wherein the filler component is substantially transmissive to UV; and
    a photoinitiator component, wherein the substantially UV radiation transmissive filler are hollow microspheres.

12. Reaction products of the composition according to claim 11.

13. A process for preparing a composition in accordance with claim 11, the steps of which comprise:
    providing the components recited in claim 11 and mixing together the components to form the composition.

14. A UV radiation curable flame-resistant composition comprising:
    a UV radiation curable silicone component;
    substantially UV transmissive solid microspheres; and
    a photoinitiator component; and
    a reactive diluent.

15. A W radiation curable flame-resistant composition comprising:
- a UV radiation curable component comprising a reactive silicone resin component;
- a filler component, wherein the filler component is substantially transmissive to UV;
- a reactive diluent; and
- a photoinitiator components wherein the reactive diluent is the combination of isobornyl acrylate and 2-phenoxyethyl acrylate.

16. Reaction products of the composition according to claim 15.

17. A process for preparing a composition in accordance with claim 15, the steps of which comprise:
- providing the components recited in claim 15 and mixing together the components to form the composition.

18. A UV radiation curable flame-resistant composition comprising:
- a UV radiation curable component comprising a reactive silicone resin component;
- a filler component, wherein the filler component is substantially transmissive to UV;
- a photoinitiator component, wherein the reactive diluent is the combination of isobornyl acrylate and 2-phenoxyethyl acrylate; and
- an inorganic filler component, wherein the inorganic filler component is a fumed hydrophobic silica filler.

19. A UV radiation curable flame-resistant composition comprising:
- a UV radiation curable component comprising a reactive silicone resin component;
- a filler component, wherein the filler component is substantially transmissive to UV; a reactive diluent;
- a photoinitiator component, wherein the reactive diluent is the combination of Isobornyl acrylate and 2 phenoxyethyl acrylate; and
- an adhesion promoter.

* * * * *